(12) United States Patent
Takashi

(10) Patent No.: US 6,726,861 B2
(45) Date of Patent: Apr. 27, 2004

(54) FOREIGN-OBJECT DETECTION METHOD FOR INJECTION MOLDING MACHINE

(75) Inventor: Hakoda Takashi, Nagano (JP)

(73) Assignee: Nissei Plastic Industrial Co., Ltd., Nagano-ken (JP)

(*) Notice: Subject to any disclaimer, the term of this patent is extended or adjusted under 35 U.S.C. 154(b) by 282 days.

(21) Appl. No.: 10/001,793

(22) Filed: Dec. 5, 2001

(65) Prior Publication Data

US 2002/0066971 A1 Jun. 6, 2002

(30) Foreign Application Priority Data

Dec. 5, 2000 (JP) ....................... 2000-370012

(51) Int. Cl.$^7$ ............................................. B29C 45/80
(52) U.S. Cl. ....................................... 264/40.1; 425/137
(58) Field of Search ........................... 264/40.1, 40.5, 264/40.7; 425/137

(56) References Cited

U.S. PATENT DOCUMENTS 4,038,003 A * 7/1977 Hansson ................. 425/137
4,710,119 A * 12/1987 Otake ..................... 425/137
5,800,750 A * 9/1998 Laing et al. .............. 264/40.5
6,409,495 B1 * 6/2002 Kamiguchi et al. ........ 264/40.1

FOREIGN PATENT DOCUMENTS

JP          5-30609         5/1993

* cited by examiner

Primary Examiner—Jill L. Heitbrink
(74) Attorney, Agent, or Firm—Birch, Stewart, Kolasch & Birch, LLP

(57) ABSTRACT

In a foreign-object detection method for an injection molding machine, a trial mold closing operation is first performed. During the trial mold closing operation, a physical value related to mold closing operation is periodically detected in a monitor region, and a maximum deviation between the detected physical value and a preset theoretical value is obtained. The thus-obtained maximum deviation is added to a preset reference value to thereby determine a threshold value to be used for foreign object detection. During an actual mold closing operation, the physical value related to mold closing operation is periodically detected in the monitor region, and a deviation between the detected physical value and the determined theoretical value is calculated. A foreign object is judged to have been caught, when the deviation is in excess of the threshold value.

11 Claims, 6 Drawing Sheets

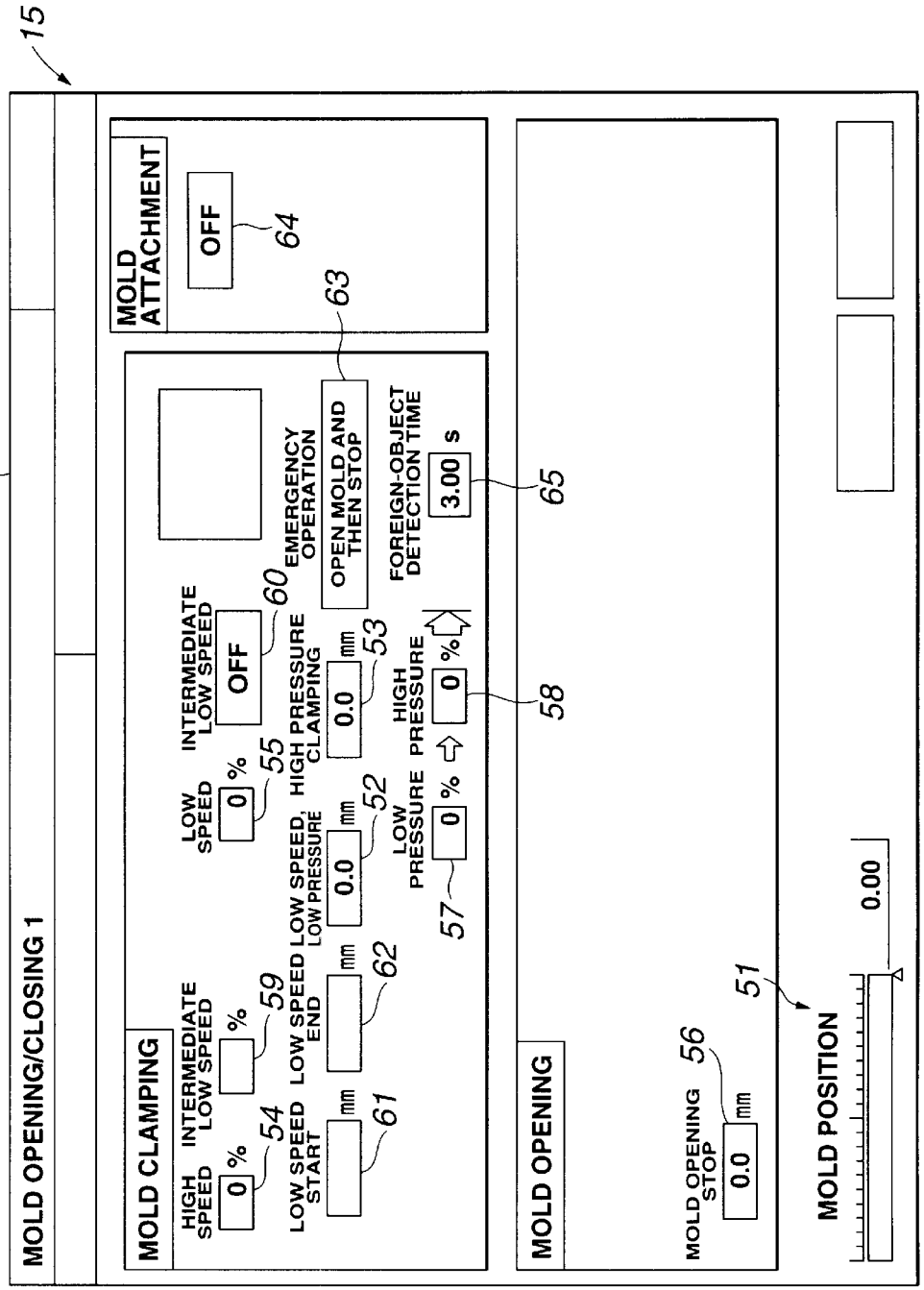

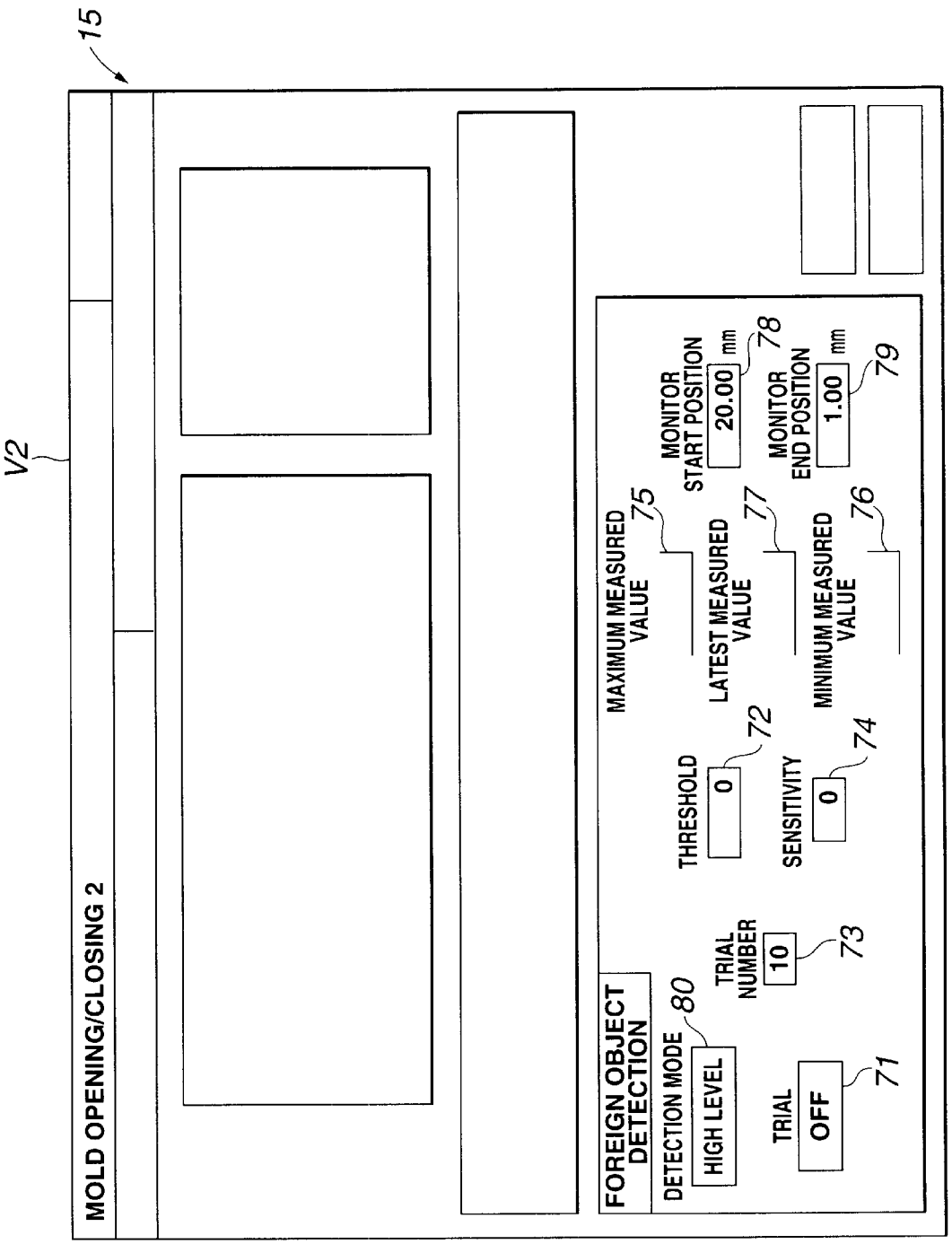

FOREIGN-OBJECT DETECTION METHOD FOR INJECTION MOLDING MACHINE

BACKGROUND OF THE INVENTION

1. Field of the Invention

The present invention relates to a foreign-object detection method for an injection molding machine, which method detects a foreign object which is caught between a movable mold and a stationary mold upon movement of a movable platen in a mold closing direction.

2. Description of the Related Art

Conventionally, in the field of an injection molding machine designed such that reciprocating motion produced by a drive unit composed of a servomotor and a ball-screw mechanism is transmitted to a movable platen via a toggle link mechanism, there has been known a foreign-object detection method for detecting a foreign object (e.g., a molded product) which is caught between a movable mold and a stationary mold upon movement of the movable platen in a mold closing direction (see, for example, Japanese Patent Application Laid-Open (kokai) No. 5(1993)-30609).

The patent publication discloses the following detection method. When a movable mold has arrived at a mold protection start position during mold closing operation, an NC controller outputs a torque limit command to thereby move the movable mold at low torque. When a difference (deviation) between a movement command signal and a feedback signal representing a position detected by a position detector exceeds a predetermined value (threshold value), a foreign object is judged to have been caught between the movable mold and the stationary mold.

In such a conventional detection method, detection is performed through comparison between a deviation and a threshold value, and therefore, setting of the threshold value is extremely important. That is, the deviation varies within a certain range even when the mold closing operation is performed properly. Therefore, when the threshold value is set to an excessively small value relative to the variation range, erroneous detection may occur, and when the threshold value is set to an excessively large value relative to the variation range, a foreign object cannot be detected properly and reliably, and in particular, a small foreign object cannot be detected at all. Therefore, in actuality, the threshold value is preset to a standard value, and an operator finely adjusts the standard value empirically and intuitionally (i.e., on the basis of personal know how).

However, such a conventional detection method requires fine adjustment (re-setting) of the threshold value whenever the mold is exchanged or whenever molding conditions are changed. Labor and time needed for such setting cannot be ignored, and reliable setting is impossible, because of variation in set values among operators.

SUMMARY OF THE INVENTION

An object of the present invention is to provide a foreign-object detection method for an injection molding machine, which method enables quick and easy setting of a threshold value used for detection of a foreign object and which enables reliable setting of a proper threshold value.

Another object of the present invention is to provide a foreign-object detection method for an injection molding machine, which method enables automatic setting of a threshold value to thereby enable precise setting without bothering an operator.

Still another object of the present invention is to provide a foreign-object detection method for an injection molding machine, which method increases a deviation generated upon catching of a foreign object to thereby enhance the foreign-object detection performance.

To achieve the above objects, the present invention provides a foreign-object detection method for an injection molding machine, comprising the steps of performing a trial mold closing operation; periodically detecting a physical value related to mold closing operation in a monitor region during the trial mold closing operation; obtaining a maximum deviation between the detected physical value and a preset theoretical value; adding the maximum deviation to a preset reference value to thereby determine a threshold value to be used for foreign object detection; periodically detecting the physical value related to mold closing operation in a monitor region during an actual mold closing operation; calculating a deviation between the detected physical value and the determined theoretical value; and judging that a foreign object has been caught when the deviation is in excess of the threshold value.

BRIEF DESCRIPTION OF THE DRAWINGS

FIG. 5 is a diagram showing a display screen used during performance of the foreign-object detection method; and FIG. 6 is a diagram showing another display screen used during performance of the foreign-object detection method.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of an injection molding machine M to which a foreign-object detection method of the present embodiment can be applied will be described with reference to FIGS. 3 and 4.

Figure 3:
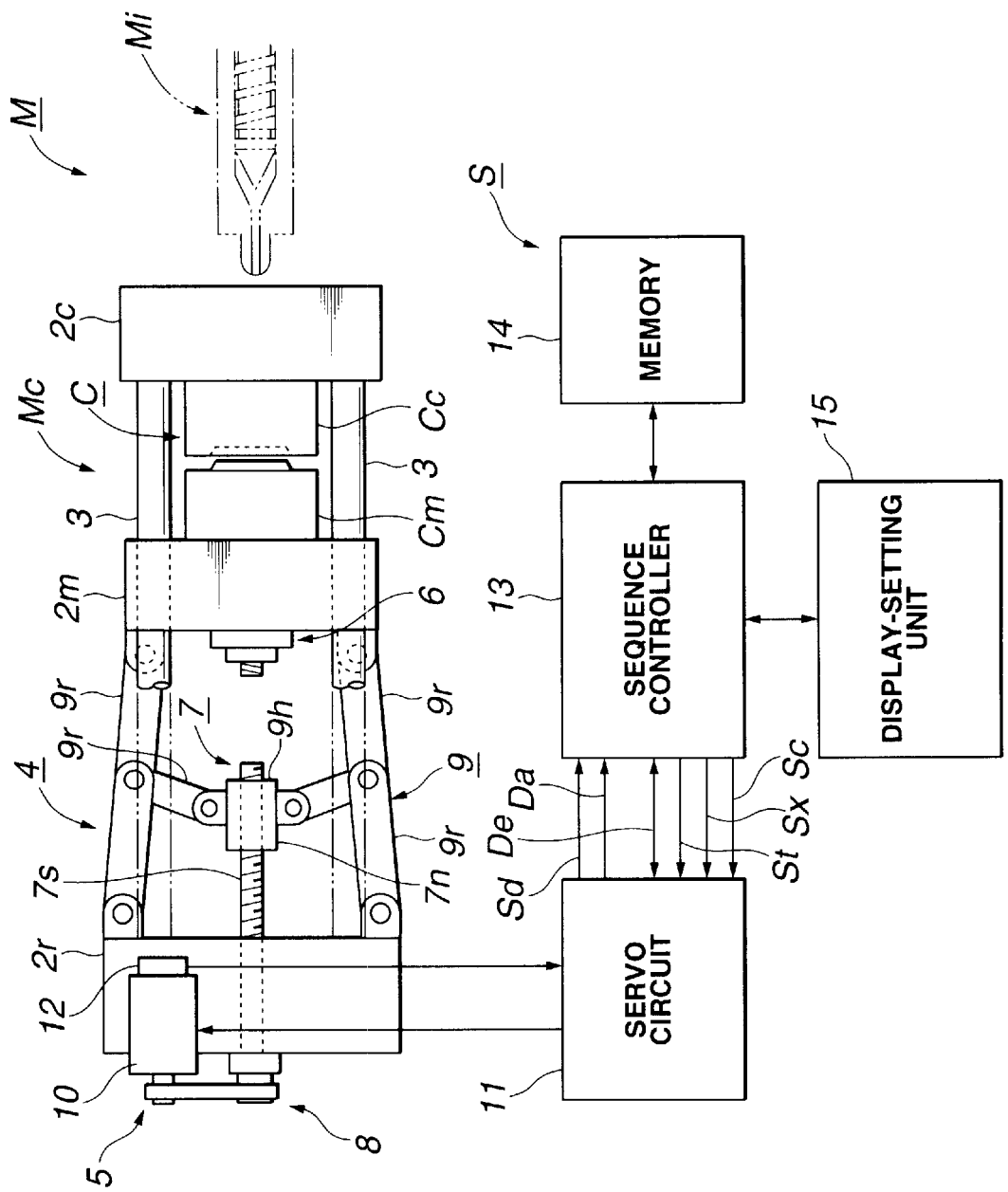
FIG. 3 is a view showing the structure of an injection molding machine to which the foreign-object detection method can be applied.

The injection molding machine M shown in FIG. 3 includes a mold clamping apparatus Mc and an injection apparatus Mi indicated by an imaginary line. The mold clamping apparatus Mc includes a stationary platen 2c and a drive base 2r which are separated from each other. The stationary platen 2c and the drive base 2r are fixedly mounted on an unillustrated machine base. Four tie bars 3 extend between the stationary platen 2c and the drive base 2r. A movable platen 2m is mounted slidably on the tie bars 3. A movable mold Cm is attached to the movable platen 2m, and a stationary mold Cc is attached to the stationary platen 2c. The movable mold Cm and the stationary mold Cc constitute a mold C.

A drive mechanism 4 is disposed between the drive base 2r and the movable platen 2m. The drive mechanism 4 includes a drive unit 5 and a toggle link mechanism 9 attached between the drive base 2r and the movable platen 2m. The drive unit 5 includes a servomotor 10 attached to the drive base 2r; a ball screw mechanism 7 composed of a ball screw 7s rotatably supported on the drive base 2r and a nut 7n in screw engagement with the ball screw 7s; and a rotation transmission mechanism 8 for transmitting rotation of the servomotor 10 to the ball screw 7s. The toggle link mechanism 9 is composed of a plurality of toggle link members 9r; and the nut 7n is fixed to a cross head 9h serving as an input portion. By virtue of the above-described configuration, reciprocating motion of the nut 7n is transmitted to the movable platen 2m via the toggle link mechanism 9. Reference numeral 6 denotes an ejector mechanism.

Meanwhile, reference letter S denotes a control system. The control system S includes a servo circuit 11, to which are connected the servomotor 10 and a rotary encoder 12 attached to the servomotor 10. A sequence controller 13 is connected to the servo circuit 11; and a memory 14 and a display-setting unit 15 are connected to the sequence controller 13. The sequence controller 13 stores therein preset values such as mold closing speeds and torque limit values during a mold closing process, their changeover positions, and a monitor region (a monitor start position and a monitor end position) for foreign-object detection. In relation to the monitor region, the monitor start position is determined in consideration of a size of a foreign object (e.g., a molded product); and a mold closed position or a position before the mold closed position is used as the monitor end position.

Figure 4:
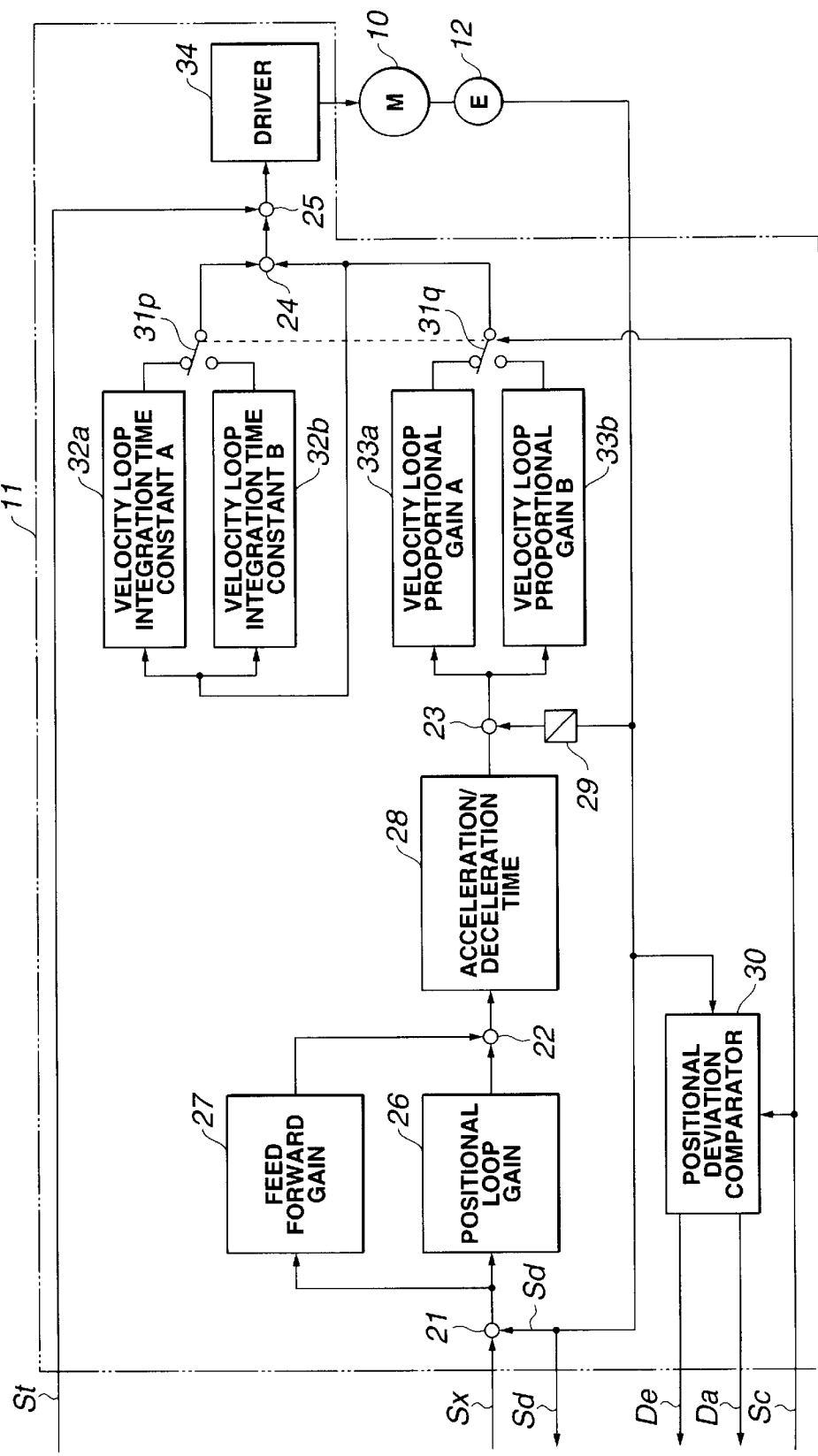
FIG. 4 is a block diagram of a servo circuit of the injection molding machine.

FIG. 4 shows a specific configuration of the servo circuit 11. The servo circuit 11 includes deviation calculation units 21, 22, 23, 24, and 25; a positional-loop-gain setting unit 26; a feed-forward-gain setting unit 27; an acceleration/deceleration-time setting unit 28; a velocity converter 29, a positional deviation comparator 30; changeover units 31p and 31q; velocity-loop integration-time-constant setting units 32a and 32b; velocity-loop proportional-gain setting units 33a and 33b; and a driver 34, to thereby constitute the circuit configuration as shown in FIG. 4. The functions (operations) of the respective portions will be described in relation to overall operation of the mold clamping apparatus Mc, which will be described later.

Next, overall operation of the mold clamping apparatus Mc which employs the foreign object detection method according to the present embodiment will be described with reference to FIGS. 1 to 6.

Figure 1:
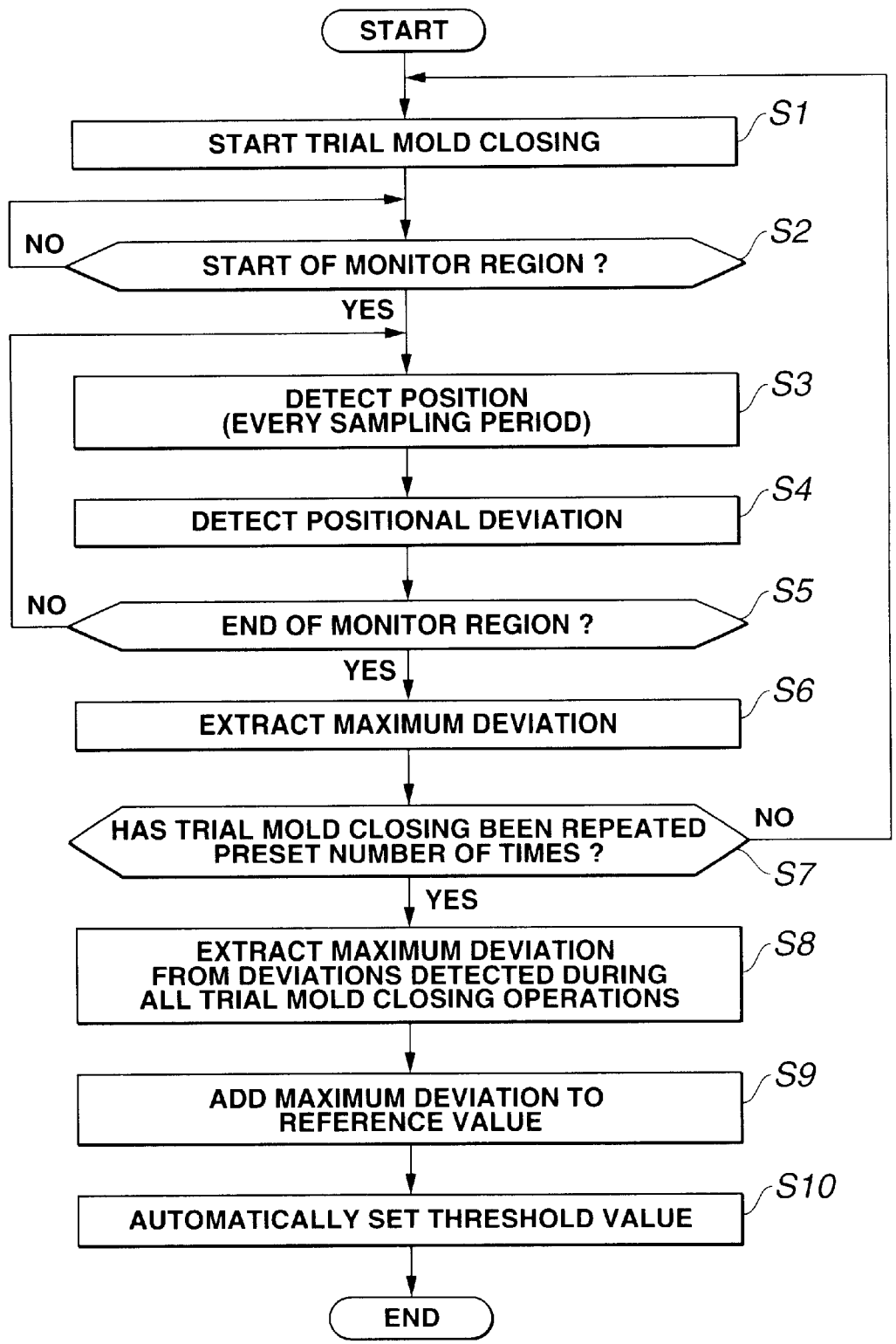
FIG. 1 is a flowchart showing a method of setting a threshold value used in a foreign-object detection method according to an embodiment of the present invention.

First, a method of setting a threshold value Ds used in the foreign object detection method according to the present embodiment will be described with reference to the flowchart shown in FIG. 1. A trial mold closing operation is first performed. In this trial mold closing operation, the movable platen 2m of the mold clamping apparatus Mc is advanced at high speed in a mold closing direction from a mold open position, whereby high-speed mold closing is effected; when the movable platen 2m reaches a deceleration start position, deceleration processing is performed; and when the movable platen 2m reaches a low-speed-movement start position, a low-speed mold closing operation is performed (step S1).

Meanwhile, when the movable platen 2m reaches a monitor region during the trial mold closing operation, a position detection operation is started (step S2). During this position detection operation, the sequence controller 13 supplies a torque limit signal St to the servo circuit 11 so as to limit the torque output of the servomotor to a preset torque limit value. Further, the sequence controller 13 supplies a position command signal Sx to the deviation calculation unit 21 of the servo circuit 11. The deviation calculation unit 21 compares the position command signal Sx with a position detection value Sd obtained from detection pulses output from the rotary encoder 12. Thus, there is obtained a positional deviation, on the basis of which position servo control; i.e., position feedback control, is performed. Notably, the positional deviation is compensated by the positional-loop-gain setting unit 26, the feed-forward-gain setting unit 27, and the acceleration/deceleration-time setting unit 28.

An output of the acceleration/deceleration-time setting unit 28 is supplied to the deviation calculation unit 23 and compared with an output of the velocity converter 29. Thus, there is obtained a velocity deviation, on the basis of which velocity servo control; i.e., velocity feedback control, is performed. Two different velocity servo gains are previously set; and in the monitor region, a servo gain different from that for the remaining regions is used. Specifically, when a monitor period signal Sc is output from the sequence controller 13, the changeover units 31p and 31q are operated in the course of operation of the servomotor 10, such that in the monitor region, the servomotor 10 is driven with a reduced gain as compared with the remaining regions.

Further, when the monitor period signal Sc is output from the sequence controller 13, the positional deviation comparator 30 obtains a positional deviation De from detection pulses output from the rotary encoder 12. Specifically, at predetermined sampling intervals (periods), the positional deviation comparator 30 repeatedly detects an actual number of detection pulses which are output from the rotary encoder 12 in each sampling interval (step S3), and calculates a deviation De of the actual pulse count from a theoretical pulse count for the case where the deviation De is zero (step S4). The thus-obtained deviation De represents a deviation of an actual position of the servomotor 10 from a theoretical position which the servomotor 10 must reach within the period corresponding to a single sampling interval. The detection of the deviation De is performed repeatedly until the servomotor 10 reaches the end of the monitor region (step S5).

Upon having reached to the end of the monitor region, the maximum deviation among the deviations De detected in the single trial mold closing operation is extracted (step S6). This extraction may be performed through an operation of storing all the detected deviations De in the memory and extracting the largest one at the end of the monitor region, or through an operation of comparing a latest deviation De with a stored maximum deviation and updating the stored maximum deviation with the latest deviation De when the latest deviation De is greater than the stored maximum deviation. The thus-extracted maximum deviation is temporarily stored in the memory 14. Subsequently, the above-described trial mold closing operation is performed a predetermined number of times (e.g., ten times) (step S7). After the trial mold closing operation has been performed the predetermined number of times, a largest deviation De among the deviations De extracted in all the trial mold closing operations is extracted (step S8). The thus-extracted largest deviation De is transferred from the servo circuit 11 to the sequence controller 13 and is added to a preset reference value (offset value) (step S9). Thus, a threshold value Ds to be used for foreign-object detection is obtained and stored. In this manner, the threshold value to be used for foreign-object detection is set automatically (step S10). The reference value is an ideal value and is set in advance. Meanwhile, the actually measured maximum or largest deviation De is peculiar to each injection molding machine. Therefore, for an injection molding machine in which the movable platen 2m does not move smoothly, resulting in detection of a relatively large deviation, a relatively large threshold value Ds is set as compared with other injection molding machines.

All the above-described processing is performed by means of sequence operation. Notably, the operation of setting the threshold value Ds through performance of trial mold closing operation is performed automatically, when the mold C is changed or when various conditions are set or changed. Further, an operator can selectively perform the trial mold closing operation by use of a selection switch 71. The automatically-set threshold value Ds is displayed on a threshold display section 72 shown in FIG. 6 and is registered in the memory 14.

FIG. 6 shows a display screen V2 which is displayed on the display-setting unit 15 so as to perform trial mold closing. The display-setting unit 15 is equipped with a touch panel; and the display screen V2 serves as a setting screen as well. Reference numeral 73 denotes a trial-number setting section for setting a number of times of trial mold closing operations to be performed. Reference numeral 74 denotes a sensitivity setting section for setting a sensitivity of foreign-object detection. Reference numeral 75 denotes a maximum-measured value display section for displaying a maximum or largest deviation De detected during the trial mold closing operations. Reference numeral 76 denotes a minimum-measured value display section for displaying a minimum deviation De detected during the trial mold closing operations. Reference numeral 77 denotes a latest-measured-value display section for displaying a deviation De detected during the latest mold closing operation, which may or may not be a trial mold closing operation. Display of the respective measured values by the display units 75, 76, and 77 as references enables detection of a foreign object in a more sophisticated manner.

Figure 2:
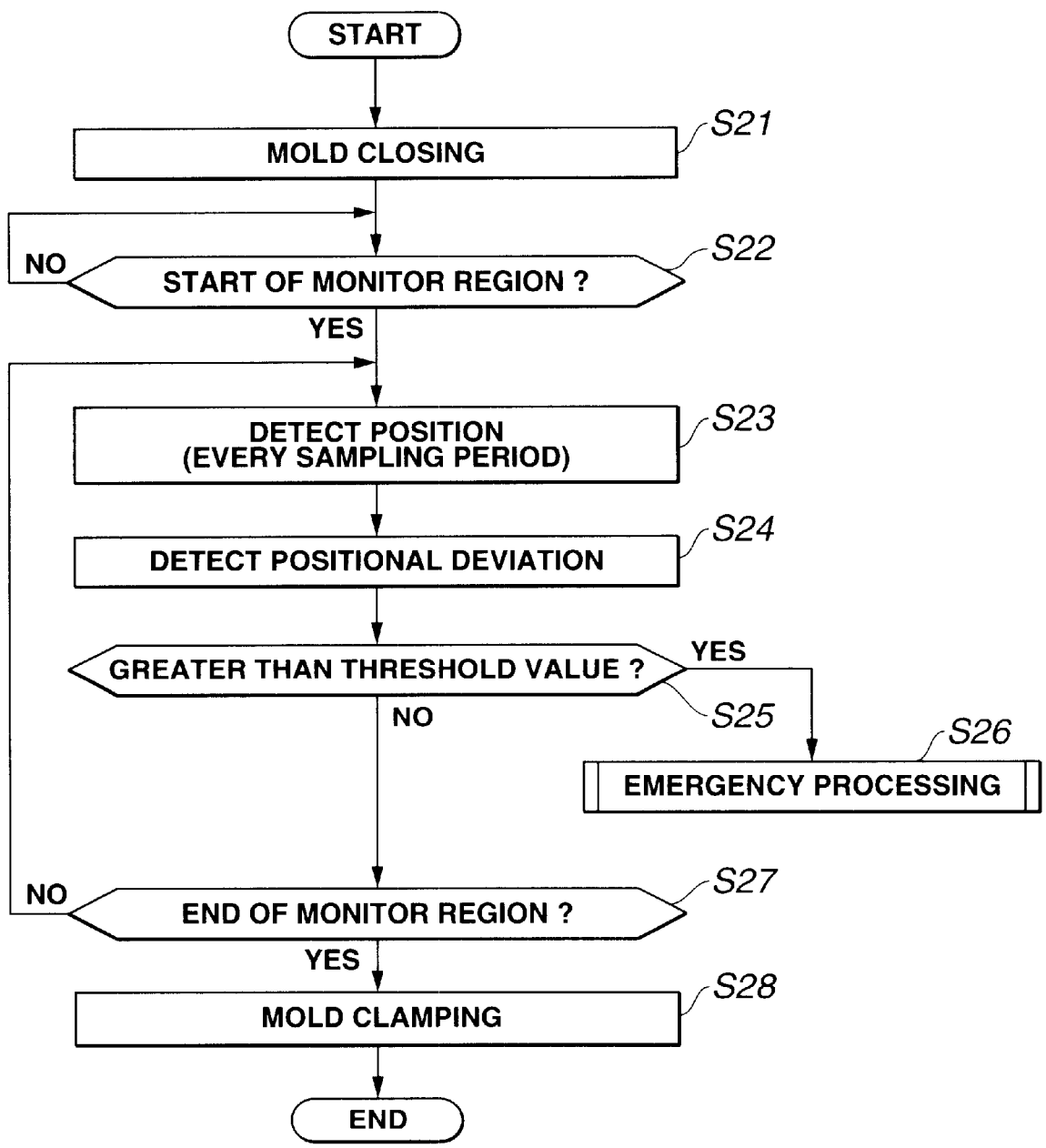
FIG. 2 is a flowchart showing a mold clamping operation during which the foreign-object detection method is performed.

Next, overall operation of the injection molding machine during a production run will be described with reference to the flowchart shown in FIG. 2. Here, we assume that the movable platen 2m of the mold clamping apparatus Mc is located at the mold open position before start of the operation of the injection molding machine. In a mold closing process, the movable platen 2m located at the mold open position starts a mold closing operation (step S21). Specifically, the movable platen 2m is advanced at high speed in the mold closing direction from the mold open position, whereby high-speed mold closing is effected. When the movable platen 2m reaches a deceleration start position, deceleration processing is performed; and when the movable platen 2m reaches a low-speed-movement start position, a low-speed mold closing operation is performed.

Meanwhile, when the movable platen 2m reaches a monitor region during the mold closing operation, a foreign-object monitoring operation is started (step S22). During this monitoring operation, the sequence controller 13 supplies a torque limit signal St to the servo circuit 11 so as to limit the torque output of the servomotor to a preset torque limit value. Further, the sequence controller 13 supplies a position command signal Sx to the deviation calculation unit 21 of the servo circuit 11. The deviation calculation unit 21 compares the position command signal Sx with a position detection value Sd obtained from detection pulses output from the rotary encoder 12. Thus, there is obtained a positional deviation, on the basis of which position servo control; i.e., position feedback control, is performed. Notably, the positional deviation is compensated by the positional-loop-gain setting unit 26, the feed-forward-gain setting unit 27, and the acceleration/deceleration-time setting unit 28.

The output of the acceleration/deceleration-time setting unit 28 is supplied to the deviation calculation unit 23 and compared with the output of the velocity converter 29. Thus, there is obtained a velocity deviation, on the basis of which velocity servo control; i.e., velocity feedback control, is performed. Two different velocity servo gains are previously set; and in the monitor region, a servo gain different from that for the remaining regions is used. Specifically, when a monitor period signal Sc is output from the sequence controller 13, the changeover units 31p and 31q are operated in the course of operation of the servomotor 10, such that in the monitor region, the servomotor 10 is driven with a reduced gain as compared with the remaining regions. Thus, a larger deviation De is detected upon presence of a foreign object, and thus the foreign-object detection performance is enhanced.

Further, when the monitor period signal Sc is output from the sequence controller 13, the positional deviation comparator 30 obtains a positional deviation De from detection pulses output from the rotary encoder 12. Specifically, at predetermined sampling intervals (periods), the positional deviation comparator 30 repeatedly detects an actual number of detection pulses which are output from the rotary encoder 12 in each sampling interval (step S23), and calculates a deviation De of the actual pulse count from a theoretical pulse count for the case where the deviation De is zero (step S24). The thus-obtained deviation De represents a deviation of an actual position of the servomotor 10 from a theoretical position which the servomotor 10 must reach within the period corresponding to a single sampling interval. The deviation De is then compared with the above-described threshold value Ds (step S25).

When a foreign object is caught between the movable mold Cm and the stationary mold Cc with the resultant delay in movement of the movable platen 2m as compared with that in a normal state, the actual pulse number decreases, and the deviation De increases abnormally. When the deviation De exceeds the threshold value Ds, a foreign object is judged to have been caught, and the servo circuit 11 outputs a foreign-object detection signal Da to the sequence controller 13. In response thereto, the sequence controller 13 performs predetermined emergency processing such as stopping of the servomotor 10, retraction operation, and generation of an alarm (step S26).

Meanwhile, in a normal state in which presence of a foreign object is not detected, the operation of detecting the deviation De is repeated at preset sampling intervals (steps S27, S23, etc.). Upon having reached the end of the monitor region, the foreign-object monitoring operation is ended (step S27). Subsequently, when the movable platen 2m reaches a low pressure end position at which low-pressure mold closing is to be ended; i.e., a mold closed position, high-pressure mold clamping is performed by means of high-pressure control (step S28).

FIG. 5 shows a display screen V1 of the display-setting unit 15 at this time. Reference numeral 51 denotes a mold position display section for enabling real-time monitoring of the present position of the movable platen 2m. Reference numeral 52 denotes a low-speed, low pressure display section for displaying a low-speed, low pressure mold closing position. Reference numeral 53 denotes a high pressure clamp display section for displaying a high pressure mold clamping position. Reference numeral 54 denotes a setting section for setting a high-speed mold closing speed. Reference numeral 55 denotes a setting section for setting a low-speed mold closing speed. Reference numeral 56 denotes a setting section for setting a mold-opening stop position. Reference numeral 57 denotes a setting section for setting a torque limit value for low pressure mold closing. Reference numeral 58 denotes a setting section for setting a high-pressure mold clamping force. Further, setting sections 59, 60, 61, and 62 are provided in order to enable sectional deceleration which is optionally performed during the mold closing operation. Moreover, a foreign-object detection processing setting section 63 is provided so as to permit an operator to selectively designate two modes of operation to be performed after detection of a foreign object; i.e., an operation mode for stopping the servomotor 10 after opening the mold and an operation mode for stopping the servomotor 10 with a foreign object caught. A changeover switch 64 permits the operator to enable and disable mold-exchange operation. Meanwhile, on the above-described display screen V2 of FIG. 6, a detection-start-position display section 78 displays the start position of the monitor region; and a detection-end-position display section 79 displays the end position of the monitor region.

The present embodiment permits the operator to select a foreign-object detection method using time as a physical value (a second detection mode) and to perform the method simultaneously with the above-described method. For the second detection mode, the operator sets in advance a low-pressure mold closing monitor time by use of a foreign-object-detection-time setting section 65. When the time required to complete low pressure mold closing becomes longer than the preset monitor time, a foreign object is judged to have been caught, and an emergency operation is performed. Reference numeral 80 denotes a selection switch for selecting the second detection mode. When the second detection mode is selected, time clocking for foreign-object detection is started when the movable platen 2m passes through the mold closing position, displayed on the low-speed, low pressure display section 52, during a mold closing operation. Simultaneously, a torque command signal St is output in order to limit the torque output to a preset torque limit value. When a foreign object is caught between the movable mold Cm and the stationary mold Cc, due to stoppage of the movable platen 2m, the low-pressure mold closing monitor time set by use of the foreign-object-detection-time setting section 65 elapses, and thus the foreign object is detected. In such a second detection mode, since the monitor is started upon passage of the mold closing position displayed on the low-speed, low pressure display section 52 irrespective of the thickness of a foreign object, problematically, the movement of the movable platen 2m continues before elapse of the low-pressure mold closing monitor time set at the foreign-object-detection-time setting section 65. However, this problem can be avoided through combined use of the second detection mode and the foreign-object detection method of the present embodiment shown in FIG. 1; and the thus-realized double protection system enables more reliable foreign object detection.

As described above, the foreign-object detection method of the present embodiment premises the basic operation of detecting the position of the movable platen 2m within a monitor region during a mold closing process and judges that a foreign object has been caught, when a deviation De between the detected position and a preset value exceeds a preset threshold value Ds. In the foreign-object detection method of the present embodiment, the basic operation is modified in such a manner that a trial mold closing is performed in advance to thereby detect a maximum deviation De, and the maximum deviation De is added to a preset reference value to thereby set the threshold value Ds. Therefore, the threshold value Ds can be set quickly and easily, and a proper threshold value can be set reliably.

Since the trial mold closing operation is performed a preset number of times, and the threshold value Ds is set automatically by means of a preset sequence operation, precise setting can be performed without bothering an operator. Moreover, since during the monitor region the servo gain of the servo circuit 11 for driving the servomotor 10 is set lower than in the remaining regions, a larger deviation De is generated upon catching of a foreign object, whereby the foreign-object detection performance is enhanced.

While the present invention has been described with reference to the preferred embodiment, the present invention is not limited thereto. Regarding structural details, technique, numerical values, among others, modifications and any omission or addition may be possible as needed without departing from the scope of the invention. For example, in the above-described embodiment, position is used as a physical value. However, the present invention can be applied to the case in which velocity, pressure, or motor drive current (load current of the servomotor 10) is used as a physical value. Further, the drive mechanism 4 of the embodiment includes the toggle link mechanism 9. However, the present invention can be applied to the case in which a direct-pressure-application type drive mechanism which does not use the toggle link mechanism is employed.

What is claimed is:

1. A foreign-object detection method for an injection molding machine, comprising:
   performing a trial mold closing operation;
   periodically detecting a physical value related to mold closing operation in a monitor region during the trial mold closing operation;
   obtaining a maximum deviation between the detected physical value and a preset theoretical value;
   adding the maximum deviation to a preset reference value to thereby determine a threshold value to be used for foreign object detection;
   periodically detecting the physical value related to mold closing operation in a monitor region during an actual mold closing operation;
   calculating a deviation between the detected physical value and the determined theoretical value; and
   judging that a foreign object has been caught when the deviation is in excess of the threshold value.

2. A foreign-object detection method for an injection molding machine according to claim 1, wherein the trial mold closing operation is performed a preset number of times, and the maximum deviation is extracted from deviations detected in all the trial mold closing operations.

3. A foreign-object detection method for an injection molding machine according to claim 1, wherein at least one of a maximum deviation and a minimum deviation obtained in the trial mold closing operation is displayed.

4. A foreign-object detection method for an injection molding machine according to claim 1, wherein the steps of determining the threshold value are performed automatically by means of a preset sequence operation.

5. A foreign-object detection method for an injection molding machine according to claim 1, wherein in the monitor region, a servo gain of a servo circuit for driving a servomotor for mold closing is made lower than in the remaining regions.

6. A foreign-object detection method for an injection molding machine according to claim 1, wherein the physical value is position.

7. A foreign-object detection method for an injection molding machine according to claim 1, wherein the physical value is time.

8. A foreign-object detection method for an injection molding machine according to claim 1, wherein the physical value is a combination of position and time.

9. A foreign-object detection method for an injection molding machine according to claim 1, wherein the physical value is velocity.

10. A foreign-object detection method for an injection molding machine according to claim 1, wherein the physical value is pressure.

11. A foreign-object detection method for an injection molding machine according to claim 1, wherein the physical value is motor drive current.

* * * * *